US005810235A

United States Patent [19]

Hoynant et al.

[11] Patent Number: 5,810,235

[45] Date of Patent: Sep. 22, 1998

[54] METHOD FOR DETECTING DISRUPTIONS IN THE TRANSPORT OF A PAPER WEB IN A PRINTING PRESS

[75] Inventors: Pierre Hoynant, Fontaine Chaalis; Alain Blanchard, Gouvieux, both of France

[73] Assignees: Heidelberger Druckmaschinen AG, Heidelberg, Germany; Heidelberg Harris SA, Montatiare Cedex, France

[21] Appl. No.: 651,216

[22] Filed: May 22, 1996

[30] Foreign Application Priority Data

May 22, 1995 [FR] France ..................................... 95/06045

[51] Int. Cl.[6] ............................ B65H 16/00; B23Q 15/00

[52] U.S. Cl. .................................. 226/1; 226/45; 226/100

[58] Field of Search .................................... 226/1, 10, 11, 226/45, 100, 27, 29

[56] References Cited

U.S. PATENT DOCUMENTS

| | | | |
|---|---|---|---|
| 4,055,288 | 10/1977 | Lace | 226/1 |
| 4,057,185 | 11/1977 | Slama et al. | 226/1 |
| 4,186,309 | 1/1980 | Gnuechtel . | |
| 4,951,567 | 8/1990 | Rodi et al. . | |
| 5,163,371 | 11/1992 | Kotterer et al. | 226/11 |
| 5,378,918 | 1/1995 | Öttl | 250/571 |

FOREIGN PATENT DOCUMENTS

| | | | |
|---|---|---|---|
| 0 502 408 B1 | 9/1992 | European Pat. Off. . | |
| 4041356 | 2/1992 | Japan | 226/1 |
| 4232055 | 8/1992 | Japan . | |
| 2 253 036 | 8/1992 | United Kingdom . | |

OTHER PUBLICATIONS

"Principles and Development of Spatial Filtering Velocimetry" (Asakura), Applied Physics B 43, 1987, pp. 209–224.

*Primary Examiner*—Rodney H. Bonck
*Assistant Examiner*—Matthew A. Kaness
*Attorney, Agent, or Firm*—Herbert L. Lerner; Laurence A. Greenberg

[57] ABSTRACT

A method for detecting disruptions in the transport of a web in a rotary printing press. A speed evaluation is performed on the web and then analyzed, including a comparison of a contactless measurement of the instantaneous speed (VPAP (t)) of the web with a speed selected from the group of speeds of the web consisting of: 1. a virtual speed (VVIRT(t) which is evaluated from the mechanical speed of the press, 2. an average speed (VAVE(t)) measured during a time before the last measurement, and 3. a speed (VPAP ($t_{k-1}$)) measured at the moment immediately before the moment when an instantaneous speed (VPAP($t_k$)) is measured. The analysis is performed to obtain a respective speed difference, and to compare the respective speed difference with a respective prescribed threshold value. If the speed difference is not within the threshold value, a signal is generated which indicates that the web is not traveling at the proper speed.

9 Claims, 2 Drawing Sheets

METHOD FOR DETECTING DISRUPTIONS IN THE TRANSPORT OF A PAPER WEB IN A PRINTING PRESS

BACKGROUND OF THE INVENTION

Field of the Invention

The invention relates to a method for detecting disruptions in the transport of a paper web in a rotary printing press and, more particularly, to such a method wherein a velocity evaluation is performed and analyzed.

The published German Patent Document DE-41 30 679 describes a method of this general type.

Two cylinders which are spaced from one another in a rotary printing press and over which a paper web passes are mechanically connected to angular encoders which determine the angular velocities of the cylinders. When the encoders determine an impermissible difference in angular velocities, the paper web is cut or the rotary printing press is stopped. This heretofore known device has a drawback in that the speed of the paper web is determined indirectly by determining the angular velocities of the cylinders. Thus, for example, if the web should tear, the free end thereof resulting from the tearing may have already ceased being in contact with one of the cylinders, but the corresponding angular encoder may nevertheless continue to indicate a "web speed". In addition, a consequence of the rotating masses is that this heretofore known device has a relatively high inertia, which is to say that the evaluated data do not always correspond to the instantaneous status of the system.

The German Patent Document DE-41 06 901 describes a web monitoring method, wherein a deviation of the web is detected optically. A consequence thereof is that what is performed is a type of distance measurement which has nothing to do with the velocity of the web. Above and beyond a given deviation of the web, the latter is stopped.

SUMMARY OF THE INVENTION

It is accordingly an object of the invention to provide a method for detecting disruptions in the transport of a paper web in a rotary printing press which is extremely precise and thus affords optimum protection of the press against damage, and permits reliable continuous or production printing.

With the foregoing and other objects in view, there is provided, in accordance with the invention, a method for detecting disruptions in transport of a web in a rotary printing press, wherein a speed evaluation is performed and analyzed, which comprises comparing a contactless measurement of the instantaneous speed (VPAP(t)) of the web with a speed selected from the group of speeds of the web consisting of a virtual speed (VVIRT(t)) thereof which is evaluated from the mechanical speed of the press, an average speed (VAVE(t)) thereof measured during a time before the last measurement, and a speed (VPAP ($t_{k-1}$)) thereof measured at the moment immediately before the moment when an instantaneous speed (VPAP($t_k$)) is measured, so as to obtain a respective speed difference ($\delta V_1$), ($\delta V_2$), ($\delta V_3$); and comparing the respective speed difference ($\delta V_1$), ($\delta V_2$), ($\delta V_3$) with a respective prescribed threshold value ($S_1$), ($S_2$), ($S_3$).

In accordance with one aspect of the invention, there is provided a method for detecting disruptions in transport of a web in a rotary printing press, wherein a speed evaluation is performed and analyzed, which comprises comparing a contactless measurement of the instantaneous speed (VPAP (t)) of the web with a virtual speed (VVIRT(t)) thereof which is evaluated from the mechanical speed of the press, so as to obtain a speed difference ($\delta V_1$); and comparing the speed difference ($\delta V_1$) with a prescribed threshold value ($S_1$).

In accordance with another aspect of the invention, there is provided a method for detecting disruptions in transport of a web in a rotary printing press, wherein a speed evaluation is performed and analyzed, which comprises comparing a contactless measurement of the instantaneous speed (VPAP (t)) of the web with an average speed (VAVE(t)) thereof during a time before the last measurement; and comparing the speed difference ($\delta V_2$) with a prescribed threshold value ($S_2$).

In accordance with a third aspect of the invention, there is provided a method for detecting disruptions in transport of a web in a rotary printing press, wherein a speed evaluation is performed and analyzed, which comprises comparing a contactless measurement of the instantaneous speed (VPAP (t)) of the web with a speed (VPAP ($t_{k-1}$)) thereof measured at a moment immediately before the moment when an instantaneous speed (VPAP($t_k$)) is measured, so as to obtain a speed difference ($\delta V_3$); and comparing the speed difference ($\delta V_3$) with a prescribed threshold value ($S_3$).

In accordance with a further mode of the invention, the detection method includes selecting the respective prescribed threshold value ($S_1$, $S_2$, $S_3$) to correspond to a maximum permissible variation in the speed of the web.

In accordance with an added mode of the invention, the method includes selecting the respective prescribed threshold value ($S_1$, $S_2$, $S_3$) to correspond to a fraction of a setpoint value for the speed of the web.

In accordance with an additional mode of the invention, the method includes automatically and continually matching the respective prescribed threshold value ($S_1$, $S_2$, $S_3$) to a setpoint speed value and/or another printing parameter.

In accordance with yet another mode of the invention, the method includes modifying the time interval between the first and the last evaluation of the speed of the web automatically in a prescribed manner depending upon printing parameters.

In accordance with a concomitant mode of the invention, the method includes triggering a web interception device and/or stopping the printing press as quickly as possible if the respective prescribed threshold value ($S_1$, $S_2$, $S_3$) is exceeded.

In accordance with the invention, the speed of the web is detected directly, namely, by optic or sonic means, for example, and therefore without contact. The evaluation is thus made on the web itself, and not indirectly by monitoring the speed of elements of the printing press, and without the interposition of devices which may introduce errors or delay into the data. At least two evaluations of the speed of the web with a time shift are made, variations in transport being performable practically without delay and instantaneously in real time through a suitable choice of the offset or shift in time. Disruptions in the transport of the web may be determined even as they are occurring.

Moreover, in accordance with the invention, a difference in the evaluated speeds of the web is established and compared with a prescribed or specified threshold value so as to make certain that variations in speed which result from external effects, for example slight extensions of the web which depend upon the moisture content thereof, do not result in an emergency stoppage of the printing press, because these variations inevitably arise during normal operation. The prescribed threshold value is such that variations in speed of the web "which are not detrimental" are below the threshold value, which is characteristic of considerable disruptions in the transport of the web during abnormal operation. The threshold value thus corresponds to a maximum permissible variation in the speed of the web.

It is advantageous for the threshold value to be a fraction of a setpoint or recommended value for the speed of the web. According to another advantageous feature, the threshold value may be matched automatically and continually to the set point speed value and/or to other printing parameters. If the actual speed exceeds or drops below the setpoint or recommended speed value by an amount which corresponds to the previously specified percentage, measures are released for preventing further transport of the web. The adopted percentage of the setpoint or recommended speed value is thus such that the threshold value has a magnitude which depends upon the actual printing speed of the press. This means that, for example, even the printing speeds at start-up or under other circumstances are controlled in a corresponding manner.

It is advantageously possible, in accordance with another manner of implementing the invention, for the time interval between the first and the last evaluation of the speed of the web to vary in a prescribed or specified manner, particularly automatically, and dependent upon the printing parameters. The "sensitivity" of the control may be modified in accordance with the selection of the time interval.

The speed of the web is preferably evaluated in accordance with the so-called spatial filtering method. This method is described in an article entitled "Principles and Development of Spatial Filtering Velocimetry", in the magazine Applied Physics B 43, pages 209 to 224, published by the Springer Press 1986, and the article is herewith incorporated by reference.

Furthermore, it is advantageous for a web interception or collection device to be triggered, and/or for the printing press to be stopped as quickly as possible if the threshold value is exceeded.

Other features which are considered as characteristic for the invention are set forth in the appended claims.

Although the invention is illustrated and described herein as a method for detecting disruptions in the transport of a paper web in a printing press, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

DESCRIPTION OF THE PREFERRED EMBODIMENTS

Figure 1:
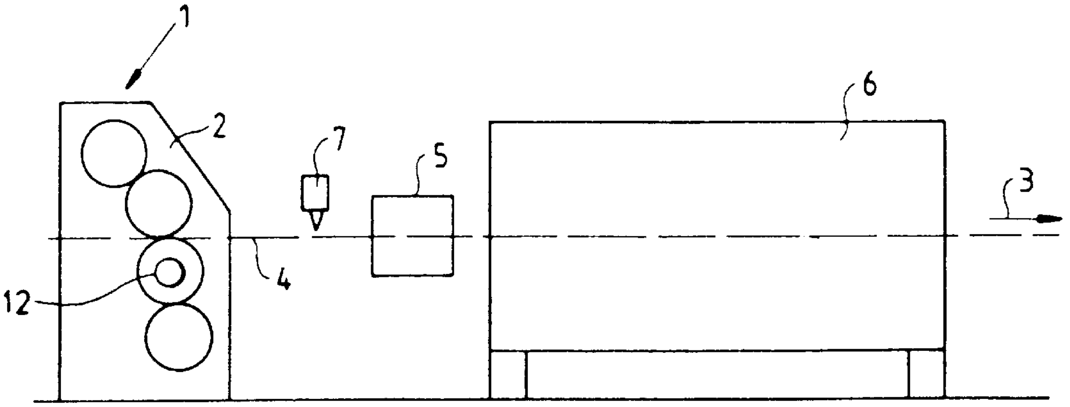
FIG. 1 is a diagrammatic side elevational view of part of a rotary printing press.

Referring now to the drawings and, first, particularly to FIG. 1 thereof, in the interest of simplicity only the last printing unit 2 of a rotary printing press 1 is represented diagrammatically therein. The mechanical velocity or speed of the printing press 1 is measured by an angular encoder 12 driven by one of the blanket cylinders of the printing unit 2; of course, the mechanical speed of the printing press 1 may be measured by other means, such as a tachymeter or tachometer driven by the kinematics of the press. The arrow 3 represents the travel direction of a paper web 4 arriving from the printing press 1. A web-interception or collecting device 5 is mounted directly downstream of and as close as possible to the printing unit 2. A drier 6 follows the web-collecting device 5. The distance between the web-collecting device 5 and the drier 6 is variable, and depends upon the configuration of the press, which may have one or more webs. Some rotary presses may have no drier.

The function of the web-collecting device 5 is to seize and wind up the torn end of the web 4 in the event that the web 4 should tear, so as to prevent it, for example, from adhering to a cylinder of the printing unit 2, and from winding or rolling up thereon and, thereby, increasing the diameter thereof. This increase in diameter presents a risk of damage or even destruction of the printing unit.

A device 7 for detecting disruptions in the transport of the paper web 4 is arranged directly downstream of the printing unit 2 in the sheet travel direction represented by the arrow 3, but upstream of the web-interception or collecting device 5. The device 7 for detecting disruptions could also be situated downstream of the web interception or collecting device 5, however. By using a contactless measuring method, the device 7 for detecting disruptions makes it possible, using a method of measuring without contact, to evaluate the instantaneous velocity VPAP(t) of the paper web 4 as a function of time t. The detection device 7 may be constructed to operate by an optical method or by a sonic method or, alternatively, by some other method, none of these various methods forming any part of the invention of the instant patent application.

Figure 2:
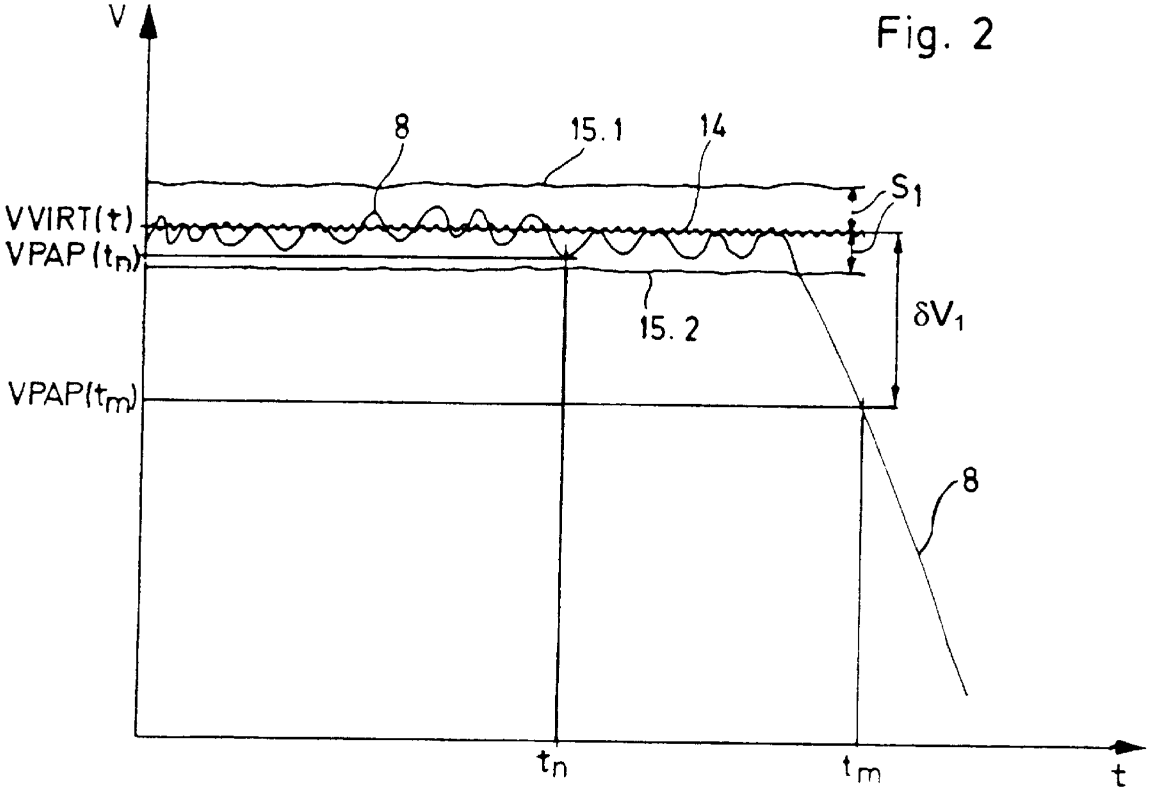
FIG. 2 is a plot diagram or graph representing the time rate of change of web velocity and the realization of a first mode of the method according to the invention.

FIG. 2 represents a realization of a first mode of the method according to the invention. The plot diagram or graph of FIG. 2 illustrates, as a function of time, the variations in the various velocities or speeds, which are commented upon hereinafter. The mechanical speed of the printing press permits the determination or evaluation of a virtual web speed or velocity VVIRT(t) indicated by the curve 14 which represents normal operation of the printing press.

The virtual web speed or velocity VVIRT(t) is the theoretical web speed or velocity, if it exists, and may be calculated from a transfer function of the mechanical speed of the press, the difference between the two speeds being due to the fulling of the blanket. The detection device 7 constantly, and using a conventional contactless method, measures the instantaneous speed VPAP(t) of the web 4, represented by the curve 8. This measurement is direct, and does not require the use of an external auxiliary device. For example, at an instant of time $t_n$, the instantaneous speed VPAP(t) of the web 4 is equal to VPAP($t_n$), the time increment being able to be adjusted between the respective measurements. The instantaneous speed VPAP(t) of the web 4 is constantly compared with the virtual web speed VVIRT (t), using an electronic system.

The detection device 7 specifies a threshold value for detecting a value $\pm S_1$ represented respectively on curves 15.1 and 15.2, the detection threshold value S1 being a deviation with respect to the virtual speed of the web, both in terms of an increase and a decrease in speed, the detection threshold value $S_1$ preferably representing a given selected percentage of a recommended speed, which is here equal to the virtual speed of the web. If the transport of the web is disrupted, for example, by the tearing thereof, the speed VPAP(t) thereof drops. Thus, at the instant of time $t_m$, as represented in FIG. 2, the instantaneous velocity or speed VPAP(t) of the web 4 drops so as to become equal to VPAP($t_m$). At the instant of time $t_m$, the difference between the virtual velocity or speed VVIRT($t_m$) of the web and the instantaneous speed VPAP($t_m$) of the web 4 is:

$$\partial v_1 = VVIRT(t_m) - VPAP(t_m).$$

In FIG. 2, this speed difference $\partial V_1$, is greater than the specified detection threshold value $S_1$. When this condition arises, that is to say when the difference between the virtual web speed VVIRT(t) and the instantaneous web speed VPAP(t) is greater than the specified detection threshold value $S_1$, then the device 7 for detecting disruptions in the transport of the paper web 4 triggers the web interception or collection device 5, and produces an emergency stoppage of the rotary printing press 1.

Figure 3:
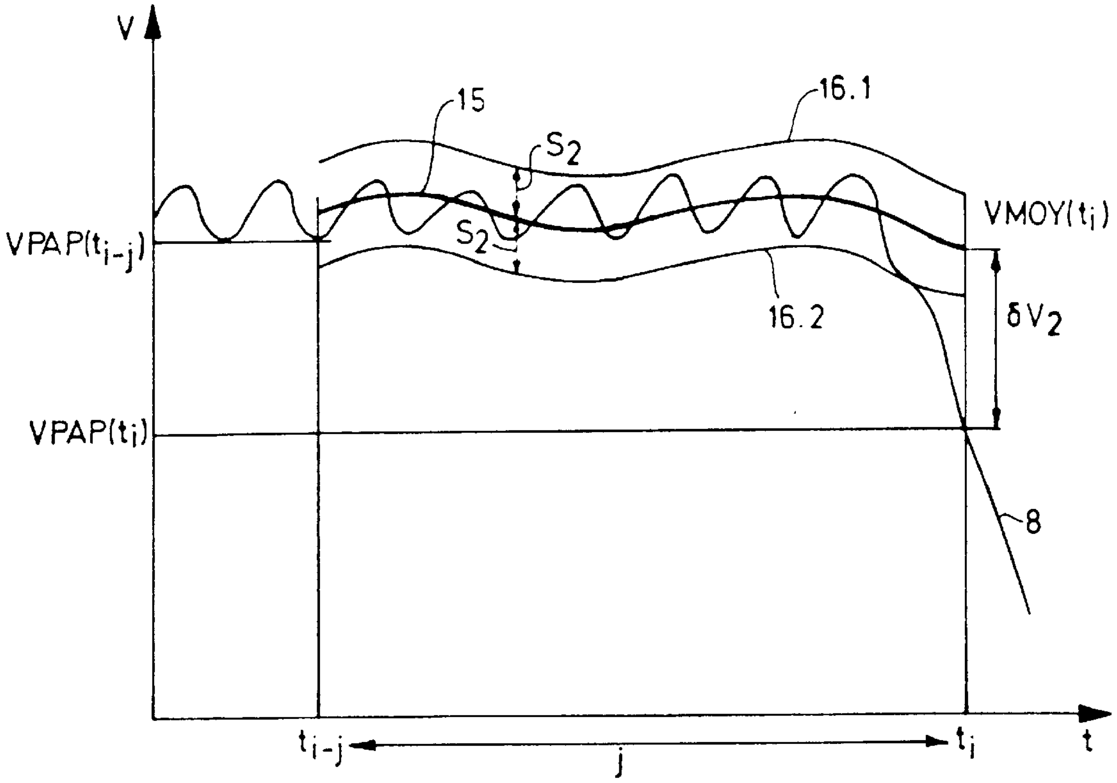
FIG. 3 is a plot diagram or graph also representing the time rate of change of web velocity and the realization of a second mode of the method according to the invention.

FIG. 3 illustrates the realization of a second mode of the method according to the invention. The graph represented in FIG. 3 shows the variations in different speeds as a function of time, which will be commented upon hereinafter.

The detection device 7, using a conventional contactless method, constantly measures the instantaneous speed VPAP (t) of the web 4 as a function of time t, as represented on the curve 8. In this second mode, the instantaneous speed VPAP(t) of the web 4 is constantly or continuously compared with the so-called average or mean web speed VMOY (t) represented on the curve 15, using an electronic system. Thus, at an instant of time $t_i$, the instantaneous speed VPAP(t) of the web 4 is equal to VPAP($t_i$). The average web speeds VMOY($t_i$) is evaluated by calculating the average instantaneous speed of the web over the last j time intervals, namely the last j measuring steps with respect to the measurement at time $t_i$. The time increment between the two measurements $t_{i-j}$ is variable. The period between the time $t_{i-j}$ and the time $t_i$ is adjustable in terms of number of increments and in terms of amplitude of increments. For example, at the time $t_{i-j}$, the instantaneous velocity or speed VPAP(t) of the web 4 is VPAP($t_{i-j}$). The detection device 7 specifies a detection threshold having a value +/−S2 represented respectively by curves 16.1 and 16.2. The detection threshold value S2 is a deviation with respect to the average web speed VMOY($t_i$), both in terms of an increase and a decrease in speed. The detection threshold value $S_2$ preferably represents a given selected percentage of a recommended or setpoint-value speed which is here equal to the average speed of the web. If the transport of the web is disrupted, for example by the tearing thereof, the speed VPAP(t) thereof drops. Hence, as represented in FIG. 3, at the instant of time $t_i$, the instantaneous speed VPAP(t) of the web 4 drops so as to become equal to VPAP($t_i$). At the instant of time $t_i$, also, the difference between the average speed VMOY($t_i$) of the web 4 and the instantaneous speed VPAP($t_i$) of the web 4 is:

$$\delta V_2 = VMOY(t_1) - VPAP(t_1).$$

This speed difference $\delta V_2$ is greater than the specified detection threshold value $S_2$. When this condition arises, that is to say when the speed difference $\delta V_2$ between the average web speed VMOY($t_i$) and the instantaneous speed VPAP($t_i$) of the web 4 is greater than the specified or prescribed detection threshold value $S_2$, then the device 7 for detecting disruptions in the transport of the paper web 4 triggers the web interception or collecting device 5 and causes an emergency stoppage of the rotary printing press 1.

Figure 4:
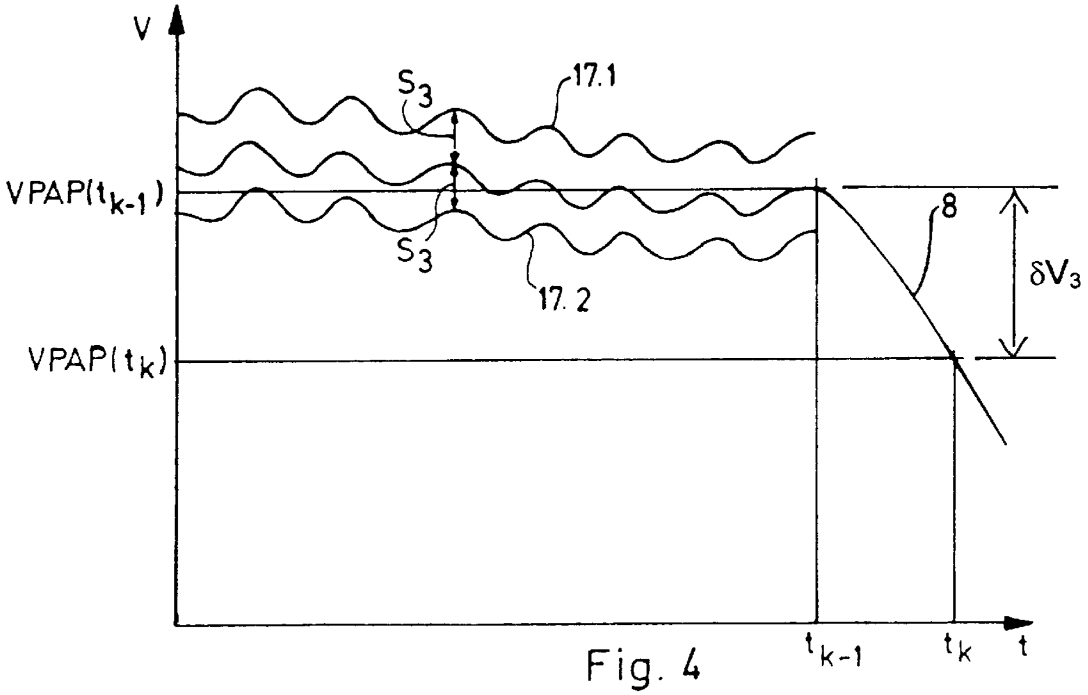
FIG. 4 is a plot diagram or graph additionally representing the time rate of change of web velocity and the realization of a third mode of the method according to the invention.

FIG. 4 illustrates the implementation or realization of a third mode of the method according to the invention. The graph of FIG. 4 represents the variations in different speeds as a function of time, which will be commented upon hereinafter.

The detection device 7, in accordance with a conventional contactless method, constantly or continuously measures the instantaneous speed VPAP(t) of the web 4 represented on the curve 8. For example, at an instant of time $t_k$, the instantaneous speed VPAP(t) of the web 4 is equal to VPAP($t_k$). In this third mode of the inventive method, the instantaneous speed VPAP(t) of the web 4, which at the instant of time $t_k$ is termed VPAP($t_k$), is constantly compared with the speed VPAP($t_{k-1}$) of the web 4 at the immediately previous measurement, namely at the instant of time $t_{k-1}$ of the web, using an electronic system. The time increment between two measurements is variable. The detection device 7 specifies a detection threshold with a value +/−$S_3$ represented respectively by curves 17.1 and 17.2. The detection threshold value $S_3$ is a deviation with respect to the recommended instantaneous speed VPAP(t) of the web 4, both in terms of an increase and a decrease in the speed. The detection threshold value $S_3$ preferably represents a given selected percentage of a recommended or setpoint speed value which is here equal to the instantaneous speed of the web. If the transport of the web is disrupted, for example by the tearing thereof, the speed VPAP(t) thereof drops. Hence, as represented in FIG. 4, at the instant of time $t_k$, the instantaneous speed VPAP(t) of the web 4 drops so as to become equal to VPAP($t_k$). The difference between the speed VPAP($t_k$) of the web, and the speed VPAP($t_{k-1}$) of the web is:

$$\delta V_3 = VPAP(t_{k-1}) - VPAP(t_k).$$

In FIG. 4, this speed difference $\delta V_3$ is greater than the specified detection threshold value $S_3$. When this condition arises, that is to say when the difference in speed $\delta V_3$ between the speed VPAP($t_{k-1}$) of the web 4 and the speed VPAP($t_k$) of the web 4 is greater than the specified detection threshold value $S_3$, the device 7 for detecting disruptions in the transport of the paper web 4 triggers the web interception or collection device 5 and produces an emergency stoppage of the rotary printing press 1.

We claim:

1. Method for detecting disruptions in transport of a web in a rotary printing press which comprises comparing a contactless measurement of an instantaneous speed (VPAP (t)) of the web with a speed selected from a group of speeds of the web consisting of a virtual speed (VVIRT(t)) thereof which is evaluated from a mechanical speed of the press, an average speed (VAVE(t)) thereof measured during a time before a last measurement, and a speed (VPAP ($t_{k-1}$)) thereof measured at a moment immediately before the moment when an instantaneous speed (VPAP($t_k$)) is measured, so as to obtain a respective speed difference ($\delta V_1$), ($\delta V_2$), ($\delta V_3$); and comparing the respective speed difference ($\delta V_1$), ($\delta V_2$), ($\delta V_3$) with a respective prescribed threshold value ($S_1$), ($S_2$), ($S_3$).

2. Detection method according to claim 1, which includes selecting the respective prescribed threshold value ($S_1$, $S_2$, $S_3$) to correspond to a maximum permissible variation in the speed of the web.

3. Method according to claim 1, which includes selecting the respective prescribed threshold value ($S_1$, $S_2$, $S_3$) to correspond to a fraction of a setpoint value for the speed of the web.

4. Method according to claim 1, wherein the respective prescribed threshold value ($S_1$, $S_2$, $S_3$) is automatically and continually matched to a setpoint speed value and another printing parameter.

5. Method according to claim 1, which includes modifying the time interval between the first and the last evaluation of the speed of the web automatically in a prescribed manner depending upon printing parameters.

6. Method according to claim 1, which includes triggering a web interception device and/or stopping the printing press as quickly as possible if the respective prescribed threshold value ($S_1$, $S_2$, $S_3$) is exceeded.

7. Method for detecting disruptions in transport of a web in a rotary printing press which comprises comparing a contactless measurement of an instantaneous speed (VPAP (t)) of the web with a virtual speed (VVIRT(t)) thereof which is evaluated from a mechanical speed of the press, so as to obtain a speed difference ($\delta V_1$); and comparing the speed difference ($\delta V_1$) with a prescribed threshold value ($S_1$).

8. Method for detecting disruptions in transport of a web in a rotary printing press which comprises comparing a contactless measurement of an instantaneous speed (VPAP (t)) of the web with an average speed (VAVE(t)) thereof during a time before a last measurement; and comparing the speed difference ($\delta V_2$) with a prescribed threshold value ($S_2$).

9. Method for detecting disruptions in transport of a web in a rotary printing press which comprises comparing a contactless measurement of an instantaneous speed (VPAP (t)) of the web with a speed (VPAP ($t_{k-1}$)) thereof measured at a moment immediately before a moment when an instantaneous speed (VPAP($t_k$)) is measured, so as to obtain a speed difference ($\delta V_3$); and comparing the speed difference ($\delta V_3$) with a prescribed threshold value ($S_3$).

* * * * *